US011645574B2

(12) United States Patent
Sasaki et al.

(10) Patent No.: US 11,645,574 B2
(45) Date of Patent: May 9, 2023

(54) RECORDING MEDIUM, REINFORCEMENT LEARNING METHOD, AND REINFORCEMENT LEARNING APPARATUS

(71) Applicants: FUJITSU LIMITED, Kawasaki (JP); Okinawa Institute of Science and Technology School Corporation, Okinawa (JP)

(72) Inventors: Tomotake Sasaki, Kawasaki (JP); Eiji Uchibe, Kunigami (JP); Kenji Doya, Kunigami (JP); Hirokazu Anai, Hachioji (JP); Hitoshi Yanami, Kawasaki (JP); Hidenao Iwane, Kawasaki (JP)

(73) Assignees: FUJITSU LIMITED KAWASAKI, JAPAN, Kawasaki (JP); OKINAWA INSTITUTE OF SCIENCE AND TECHNOLOGY SCHOOL CORPORATION, Okinawa (JP)

( * ) Notice: Subject to any disclaimer, the term of this patent is extended or adjusted under 35 U.S.C. 154(b) by 712 days.

(21) Appl. No.: 16/130,482

(22) Filed: Sep. 13, 2018

(65) Prior Publication Data

US 2019/0087751 A1    Mar. 21, 2019

(30) Foreign Application Priority Data

Sep. 15, 2017 (JP) .............................. JP2017-177970

(51) Int. Cl.
*G06N 3/00*        (2023.01)
*G06N 20/00*       (2019.01)
(Continued)

(52) U.S. Cl.
CPC ............. *G06N 20/00* (2019.01); *G06N 3/006* (2013.01); *H04L 41/0816* (2013.01); *H04L 41/16* (2013.01); *H04L 43/08* (2013.01)

(58) Field of Classification Search
CPC ... G05B 13/0265; G05B 13/025; G06F 17/16; G06N 20/00; G06N 3/006; H01L 41/16;
(Continued)

(56) References Cited

U.S. PATENT DOCUMENTS 5,608,843 A * 3/1997 Baird, III ........... G05B 13/0265
706/25
2010/0114807 A1    5/2010 Ueda et al.
(Continued)

FOREIGN PATENT DOCUMENTS

JP        2010-134907        6/2010

OTHER PUBLICATIONS

Steven J. Bradtke et al., "Adaptive linear quadratic control using policy iteration", American Control Conference, Baltimore, Maryland, Jun. 1994, pp. 3475-3479.
(Continued)

*Primary Examiner* — Caridad Everhart
(74) *Attorney, Agent, or Firm* — Staas & Halsey LLP

(57) ABSTRACT

A non-transitory, computer-readable recording medium stores therein a reinforcement learning program that uses a value function and causes a computer to execute a process comprising: estimating first coefficients of the value function represented in a quadratic form of inputs at times in the past than a present time and outputs at the present time and the times in the past, the first coefficients being estimated based on inputs at the times in the past, the outputs at the present time and the times in the past, and costs or rewards that corresponds to the inputs at the times in the past; and determining second coefficients that defines a control law, based on the value function that uses the estimated first coefficients and determining input values at times after estimation of the first coefficients.

10 Claims, 7 Drawing Sheets

(51) Int. Cl.
*H04L 41/0816* (2022.01)
*G06N 3/006* (2023.01)
*H04L 41/16* (2022.01)
*H04L 43/08* (2022.01)

(58) Field of Classification Search
CPC .. H01L 41/0816; H04L 41/0816; H04L 43/08
See application file for complete search history.

(56) References Cited

U.S. PATENT DOCUMENTS

| | | | |
|---|---|---|---|
| 2012/0100134 A1* | 4/2012 | Lenz | A61P 35/00 |
| | | | 424/133.1 |
| 2014/0201126 A1* | 7/2014 | Zadeh | A61B 5/165 |
| | | | 706/52 |
| 2018/0165554 A1* | 6/2018 | Zhang | G06K 9/6256 |
| 2018/0218380 A1* | 8/2018 | Fujimaki | G06F 17/11 |
| 2018/0226076 A1* | 8/2018 | Kotti | G10L 15/22 |
| 2018/0246801 A1* | 8/2018 | Krauss | G06F 11/3688 |

OTHER PUBLICATIONS

Tsutomu Mita et al., "A New Optimal Digital Output Feedback Control and Its Application to the Control of Mechanical Systems", Transactions of the Society of Instrument and Control Engineers, vol. 22, No. 12, 1986, pp. 1262-1268.

Steven J. Bradtke, "Incremental Dynamic Programming for On-Line Adaptive Optimal Control", Ph.D. Dissertation. University of Massachusetts, Amherst, MA, USA. UMI Order No. GAX95-10446, Aug. 1994, 133 pages total.

F. L. Lewis, "Reinforcement Learning for Partially Observable Dynamic Processes: Adaptive Dynamic Programming Using Measured Output Data", IEEE Transactions on Systems, Man, and Cybernetics-Part B: Cybernetics, vol. 41, No. 1, Feb. 2011, 12 pages total.

Kemin Zhou et al., "Robust and Optimal Control", Prentice Hall, 1996, ISBN:0-13-456567-3, 2 pages total.

Shigeyasu Kawaji, "On the Digital Control Using Dead-Beat Observers" IEEJ Transactions on Electronics, Information and Systems vol. 108, No. 3, 1988, pp. 174-180.

Yunmin Zhu et al., "Recursive Least Squares With Linear Constraints", Communications in Information and Systems, vol. 7, No. 3, 2007, pp. 287-312.

Christoph Dann, "Policy Evaluation with Temporal Differences: A Survey and Comparison", Journal of Machine Learning Research 15, 2014, pp. 809-883.

Chapter 11, p. 373-p. 403 of William L. Brogan, "Modern Control Theory", Prentice Hall, Upper Saddle River, NJ, 3rd edition, 1991. http://docs.znu.ac.ir/members/pirmohamadi_ali/Control/Brogan(BookZZ.org).pdf downloaded Nov. 2, 2022.

* cited by examiner

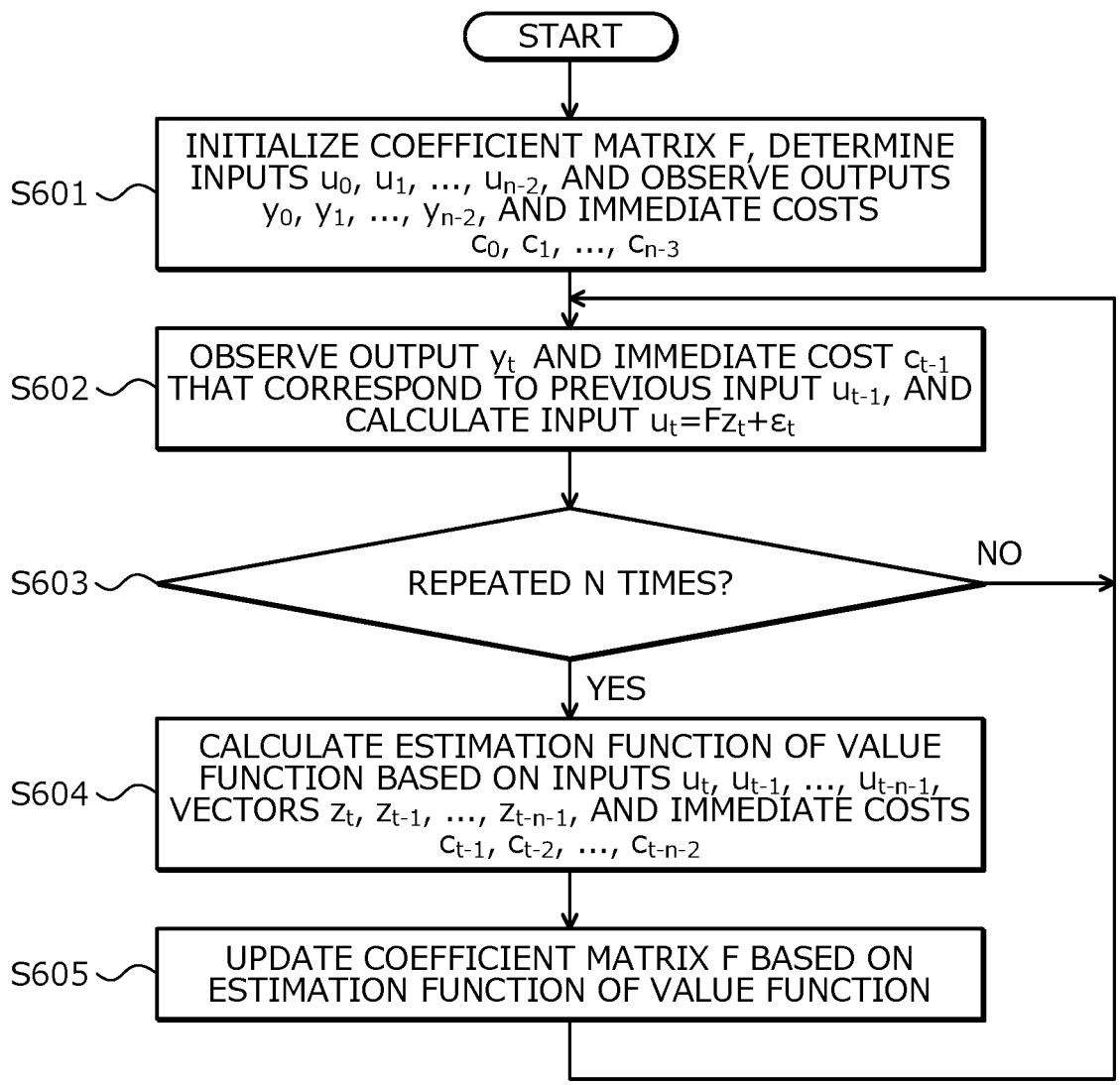

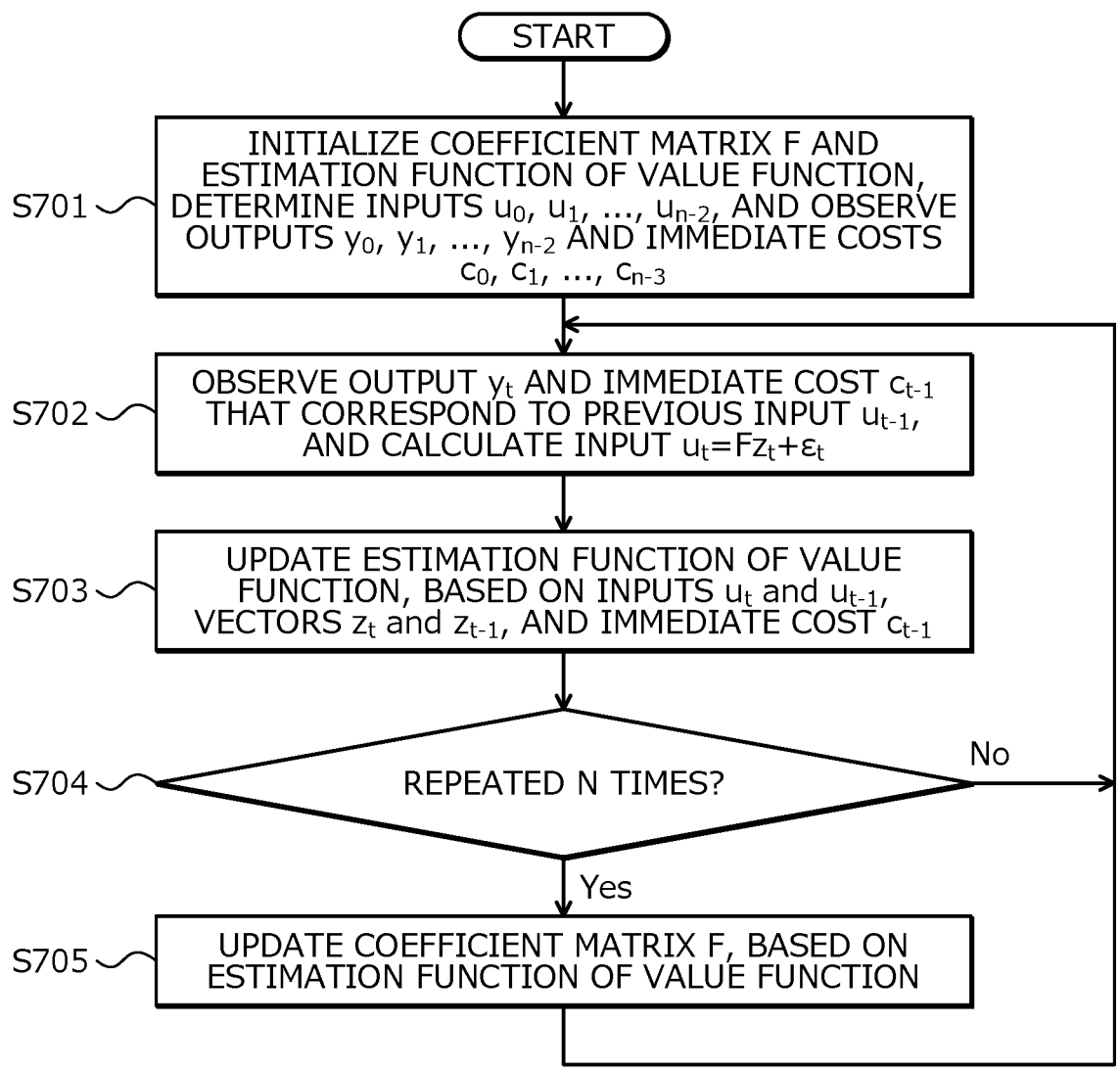

RECORDING MEDIUM, REINFORCEMENT LEARNING METHOD, AND REINFORCEMENT LEARNING APPARATUS

CROSS REFERENCE TO RELATED APPLICATIONS

This application is based upon and claims the benefit of priority of the prior Japanese Patent Application No. 2017-177970, filed on Sep. 15, 2017, the entire contents of which are incorporated herein by reference.

FIELD

The embodiments discussed herein relate to a recording medium, a reinforcement learning method, and a reinforcement learning apparatus.

BACKGROUND

A technique of reinforcement learning has traditionally been present according to which, based on an immediate cost or an immediate reward given to a controlled object corresponding to an input for the controlled object (environment), a control law to minimize or maximize a value function that represents an accumulated cost or an accumulated reward given to the controlled object is learned and an input value for the controlled object is determined.

For example, a technique is present as a prior art. According to the technique, a value of a gradient of a first value function that is a temporal derivative of a first value function as a learning result and that is determined corresponding to a first reward acquired from a controlled object (environment) is utilized for evaluation of a second reward and an action policy is determined based on the second reward (see, for example, Japanese Laid-Open Patent Publication No. 2010-134907).

SUMMARY

According to an aspect of an embodiment, a non-transitory, computer-readable recording medium stores therein a reinforcement learning program that uses a value function and causes a computer to execute a process comprising: estimating first coefficients of the value function represented in a quadratic form of inputs at the times in the past than a present time and outputs at the present time and the times in the past, the first coefficients being estimated based on inputs at the times in the past, the outputs at the present time and the times in the past, and costs or rewards that corresponds to the inputs at the times in the past; and determining second coefficients that defines a control law, based on the value function that uses the estimated first coefficients and determining input values at the times after estimation of the first coefficients.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a flowchart of an example of a procedure for a reinforcement learning process in a batch processing form; and FIG. 7 is a flowchart of an example of a procedure for a reinforcement learning process in a sequential processing form.

DESCRIPTION OF THE INVENTION

First, problems associated with the traditional techniques will be described. The state of the controlled object may not be directly observed and what affects the immediate cost or the immediate reward corresponding to the input for the controlled object may be unknown. In this case, with the traditional technique, it is difficult to accurately determine the input value for the controlled object.

Embodiments of a recording medium storing a reinforcement learning program, a reinforcement learning method, and a reinforcement learning apparatus according to the present disclosure will be described in detail with reference to the accompanying drawings.

Figure 1:
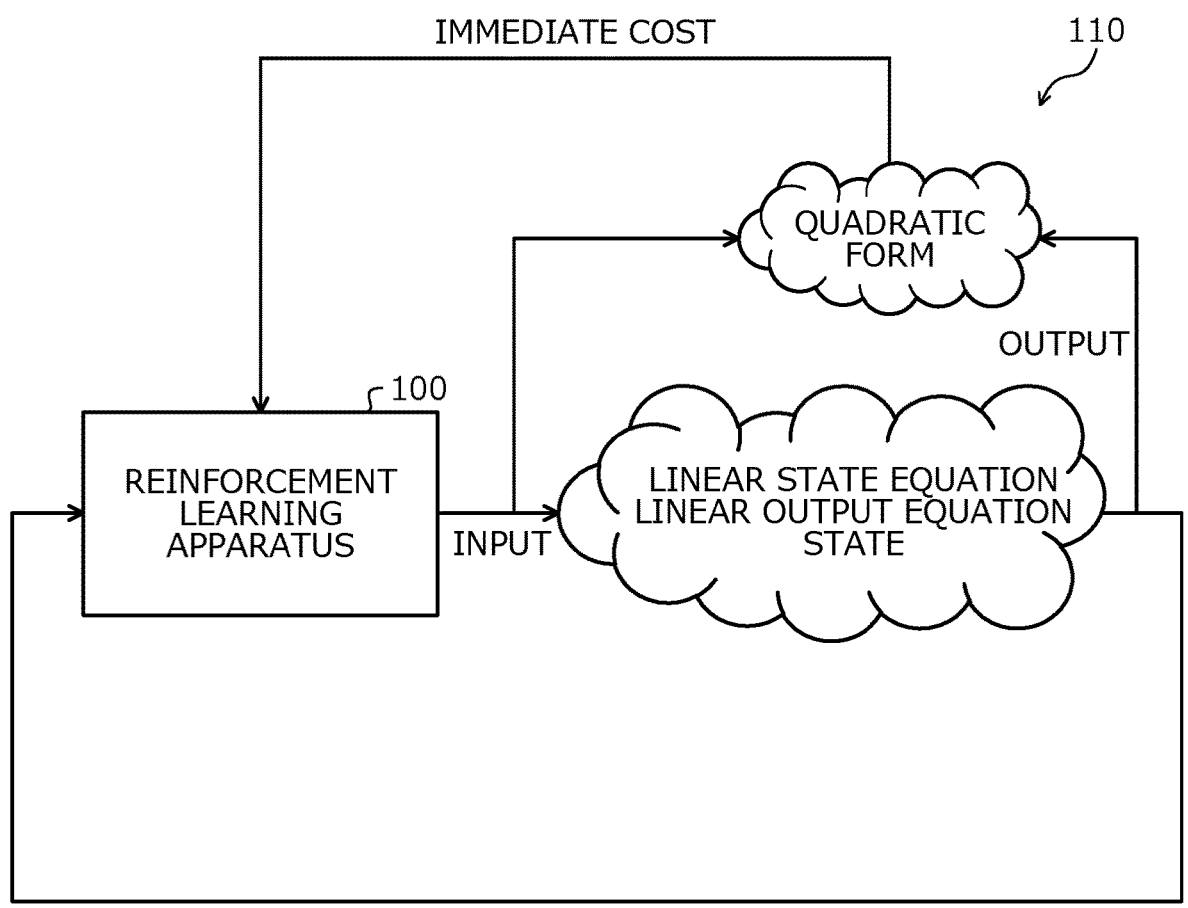
FIG. 1 is an explanatory diagram of an EXAMPLE of a reinforcement learning method according to an embodiment.

FIG. 1 is an explanatory diagram of an EXAMPLE of a reinforcement learning method according to an embodiment. A reinforcement learning apparatus 100 is a computer that controls a controlled object 110 by determining an input value for the controlled object 110. The reinforcement learning apparatus 100 is, for example, a server, a personal computer (PC), or a microcontroller.

The controlled object 110 is a certain object and is, for example, a physical system that actually exists. The controlled object is also referred to as "environment". The controlled object 110 is, for example, a server room or an electric generator. The input is an operation for the controlled object 110. The input is also referred to as "action". The state of the controlled object 110 is varied corresponding to the input for the controlled object 110, and an output of the controlled object 110 is observed.

For example, a first control approach to a fifth control approach and the like may be considered as control approaches each of controlling the controlled object 110.

For example, the first control approach may be considered using as a reference, S. J. Bradtke, B. E. Ydstie and A. G. Barto, "Adaptive linear quadratic control using policy iteration", In Proc. of the 1994 American Control Conference, pp. 3475-3479, Baltimore, USA, 1994. The first control approach is a control approach in which the controlled object 110 is controlled by reinforcement learning method for which the variation of the controlled object 110 is represented by a discrete-time linear time-invariant state equation and the immediate cost of the controlled object 110 is represented in a quadratic form; and a situation is assumed where the state of the controlled object 110 is directly observed.

For example, the second control approach may be considered. The second control approach is a control approach in which a situation is assumed where coefficient matrices of the state equation, the output equation, and the immediate cost equation in the quadratic form, of the controlled object 110 are known. With the second control approach, the controlled object 110 is controlled by estimating the state of the controlled object 110 based on the output of the controlled object 110.

For example, the third control approach may be considered using as a reference, Mita, Pang, and Liu, "A New Optimal Digital Output Feedback Control and Its Application to the Control of Mechanical Systems", Journal of Society of Instrument and Control Engineers, Vol. 22, No. 12, pp. 20-26, 1986. The third control approach is a control approach in which the controlled object 110 is controlled based on inputs and outputs of the controlled object 110 at times in the past, assuming a situation where coefficient matrices of the state equation, the output equation, and the immediate cost equation in the quadratic form, of the controlled object 110 are known.

For example, the fourth control approach may be considered using as a reference, Steven Joseph Bradtke, "Incremental Dynamic Programming for On-Line Adaptive Optimal Control", Ph.D. Dissertation, University of Massachusetts, Amherst, Mass., USA, UMI Order No. GAX95-10446, 1995. The fourth control approach is a control approach in which the controlled object 110 is controlled by reinforcement learning method for which the variation of the controlled object 110 is represented by a discrete-time linear time-invariant state equation and the immediate cost of the controlled object 110 is represented in the quadratic form; and a situation is assumed where the state of the controlled object 110 is not directly observed. With the fourth control approach, an input value at the present time is derived based on outputs at k times in the past and inputs at l times in the past.

For example, the fifth control approach may be considered using as a reference, F. L. Lewis and K. G. Vamvoudakis, "Reinforcement Learning for Partially Observable Dynamic Processes: Adaptive Dynamic Programming Using Measured Output Data", IEEE Transactions on Systems, Man, and Cybernetics, Part B (Cybernetics), Vol. 41, No. 1, pp. 14-25, 2011. The fifth control approach is a control approach in which the controlled object 110 is controlled by reinforcement learning method for which the variation of the controlled object 110 is represented by a discrete-time linear time-invariant state equation, and a situation is assumed where a coefficient matrix in the immediate cost equation in the quadratic form with respect to the input for the controlled object 110 is known. With the fifth control approach, an input value at the present time is derived based on outputs at times in the past and the present, inputs at the times in the past, and a coefficient matrix in the immediate cost equation in a quadratic form with respect to the input for the controlled object 110.

As depicted in FIG. 1, as to the controlled object 110, a situation is present where the coefficient matrices of the state equation, the output equation, and the immediate cost equation in the quadratic form, of the controlled object 110 are unknown and the state of the controlled object 110 is not directly observed. Control of the controlled object 110 is desired also for the case where the controlled object 110 is in the situation depicted in FIG. 1.

It is however difficult for the first to the fifth control approaches to efficiently learn the control law and accurately determine the input value for the controlled object 110 in a case where the controlled object 110 is in a situation such as that depicted in FIG. 1. The control law is also referred to as "policy".

For example, a situation is assumed for the first control approach where the state of the controlled object 110 is directly observed, and it is difficult to apply the first control approach to the situation as depicted in FIG. 1. Even when the first control approach is applied to a situation such as that depicted in FIG. 1 by handling the output of the controlled object 110 directly observed as a substitute of the state of the controlled object 110, the control law cannot be learned efficiently and an input value for the controlled object 110 cannot be determined accurately.

For example, a situation is assumed for each of the second control approach and the third control approach where the coefficient matrices of the state equation, the output equation, and the immediate cost equation in the quadratic form, of the controlled object 110 are known, and it is difficult to apply these control approaches to a situation such as that depicted in FIG. 1.

With the fourth control approach, for example, it is difficult to identify advantageous values to be set as k and l when the input value at the present time is derived based on outputs at the k times in the past and inputs at the l times in the past. With the fourth control approach, when values relatively greater than the values advantageous to be set as k and l are set, the control law cannot be learned efficiently.

With the fourth control approach, when values smaller than the values advantageous to be set as k and l are set, it is difficult to efficiently learn the control law and accurately determine the input value for the controlled object 110. With the fourth control approach, when the input value at the present time is determined, no output at the present time is used and it is therefore difficult to efficiently learn the control law and accurately determine the input value for the controlled object 110.

With the fifth control approach, for example, the coefficient matrix in the immediate cost equation in the quadratic form with respect to the input for the controlled object 110 is used as a part of the control law, and the input value at the present time cannot therefore be determined unless in the situation where the coefficient matrix in the immediate cost equation in the quadratic form with respect to the input for the controlled object 110 is used is known. It is therefore difficult to apply the fifth control approach to a situation such as that depicted in FIG. 1.

In the present embodiment, a reinforcement learning method will be described that is also applicable to a situation where the state of the controlled object 110 is not directly observed and what affects the immediate cost or the immediate reward corresponding to the input for the controlled object 110 is unknown.

In the example of FIG. 1, the state equation, the output equation, and the immediate cost equation in the quadratic form, of the controlled object 110 are defined and the problem setting is executed for a case where the controlled object 110 is in a situation such as that depicted in FIG. 1. A specific example of the problem setting will be described later in EXAMPLE.

The reinforcement learning apparatus 100 handles this problem setting as a problem setting that is equivalent to the problem setting for which observation is full observation regarding the inputs at times further in the past than the present time and the outputs at the present time and the times further in the past than the present time, and executes the following operations.

The reinforcement learning apparatus 100 estimates the coefficients of the value function based on the inputs at the times in the past, the outputs at the present time and the times in the past, and the cost or the reward corresponding to the inputs at the times in the past. The value function is represented by the quadratic form of the inputs at the times in the past and the outputs at the present time and the times in the past. A specific example of the estimation of the coefficients of the value function will be described later in EXAMPLE.

Based on the value function that uses the estimated coefficients, the reinforcement learning apparatus 100 determines the input value at a time after the estimation. For example, based on the value function that uses the estimated coefficients, the reinforcement learning apparatus 100 identifies the coefficients of the control law and, based on the control law, determines the input value at the time after the estimation. A specific example of the determination of the input value will be described later in EXAMPLE.

For a case where the controlled object 110 is in a situation such as that depicted in FIG. 1, the reinforcement learning apparatus 100 may also efficiently learn the control law and accurately determine the input value for the controlled object 110 based on the reinforcement learning. "Efficiently learning the control law" refers to sequentially updating the control law so that the value function is efficiently optimized.

For the case where the controlled object 110 is in the situation as depicted in FIG. 1, the reinforcement learning apparatus 100 may also realize the reinforcement learning and may expand the scope of the object that may be set as the controlled object 110. For example, even when the coefficient matrices of the state equation, the output equation, and the immediate cost equation in the quadratic form, of the controlled object 110 are unknown, the reinforcement learning apparatus 100 may realize reinforcement learning. Even when the state of the controlled object 110 is not directly observed, the reinforcement learning apparatus 100 may realize reinforcement learning.

With the fourth control approach, it is difficult to efficiently learn the control law and accurately determine the input value for the controlled object 110 because it is difficult to set advantageous values as k and l. In contrast, because the reinforcement learning apparatus 100 does not use k and l, the reinforcement learning apparatus 100 enables efficient learning of the control law and the accurate determination of the input value for the controlled object 110 to be facilitated.

With the fifth control approach, because the coefficient matrix in the immediate cost equation in the quadratic form with respect to the input for the controlled object 110 is used as a part of the control law, the situation is assumed where the coefficient matrix in the immediate cost equation in the quadratic form with respect to the input for the controlled object 110 is known. In contrast, the reinforcement learning apparatus 100 may handle the problem setting to be equivalent to a problem setting for which observation is full observation, and the coefficient matrix in the immediate cost equation in the quadratic form with respect to the input for the controlled object 110 needs not be used. The reinforcement learning apparatus 100 is therefore applicable to the case where the coefficient matrix in the immediate cost equation in the quadratic form with respect to the input for the controlled object 110 is unknown, and may expand the scope of the object that may be set as the controlled object 110.

An example of a hardware configuration of the reinforcement learning apparatus 100 depicted in FIG. 1 will be described using FIG. 2.

Figure 2:
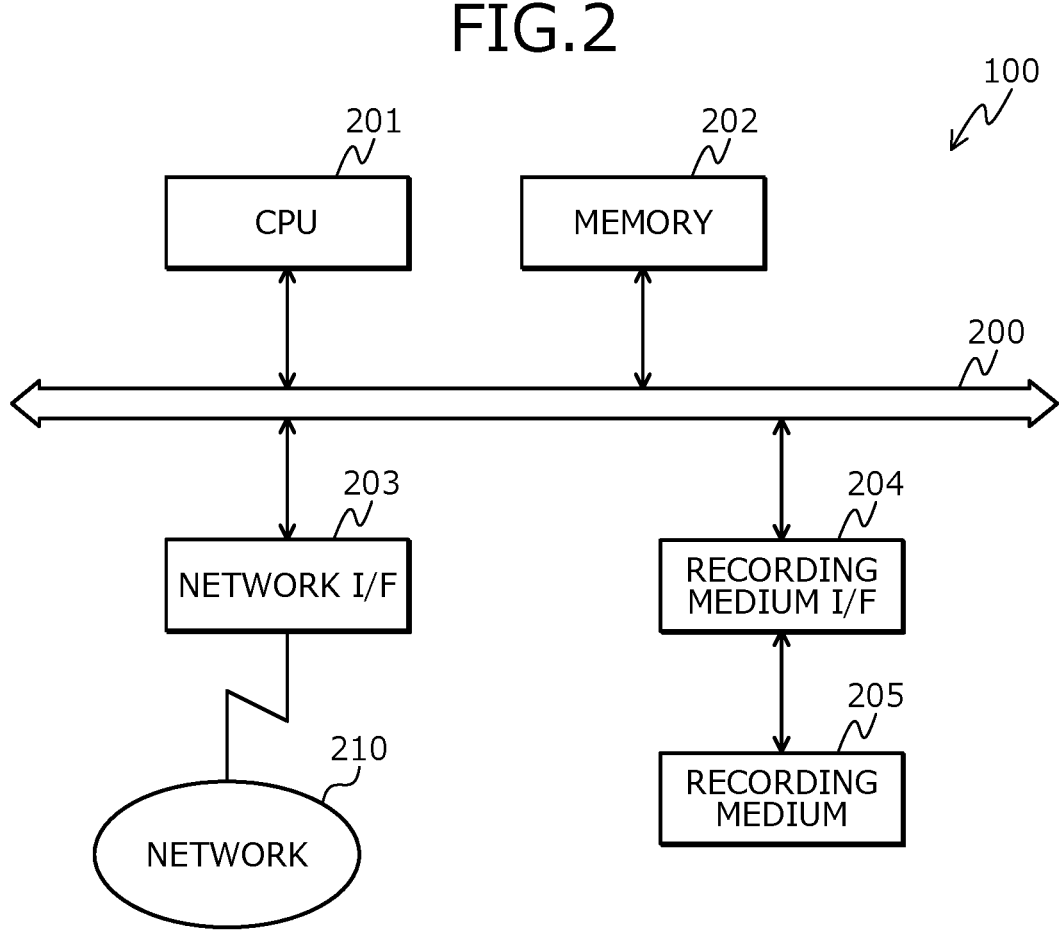
FIG. 2 is a block diagram depicting an example of a hardware configuration of a reinforcement learning apparatus 100.

FIG. 2 is a block diagram depicting an example of a hardware configuration of the reinforcement learning apparatus 100. In FIG. 2, the reinforcement learning apparatus 100 includes a central processing unit (CPU) 201, a memory 202, a network interface (I/F) 203, a recording medium I/F 204, and a recording medium 205, respectively connected by a bus 200.

Here, the CPU 201 governs overall control of the reinforcement learning apparatus 100. The memory 202 includes, for example, read only memory (ROM), random access memory (RAM), a flash ROM, etc. In particular, for example, the flash ROM and the ROM store therein various types of programs; and the RAM is used as a work area of the CPU 201. The programs stored by the memory 202 are loaded onto the CPU 201, whereby encoded processes are executed by the CPU 201.

The network I/F 203 is connected to a network 210 through a communications line and is connected to another computer through the network 210. The network I/F 203 administers an internal interface with the network 210 and controls the input and output of data from the other computer. A modem, a LAN adapter, etc., for example, may be adopted as the network I/F 203.

The recording medium I/F 204, under the control of the CPU 201, controls the reading and writing of data with respect to the recording medium 205. The recording medium I/F 204 is, for example, a disk drive, a solid state drive (SSD), a universal serial bus (USB) port, etc. The recording medium 205 is non-volatile memory storing therein data written thereto under the control of the recording medium I/F 204. The recording medium 205 is, for example, a disk, a semiconductor memory, a USB memory, etc. The recording medium 205 may be detachable from the reinforcement learning apparatus 100.

The reinforcement learning apparatus 100 may include, for example, a keyboard, a mouse, a display, a touch panel, a printer, a scanner, etc. in addition to the components above. Further, the reinforcement learning apparatus 100 may omit the recording medium I/F 204 and the recording medium 205.

An example of a functional configuration of the reinforcement learning apparatus 100 will be described with reference to FIG. 3.

Figure 3:
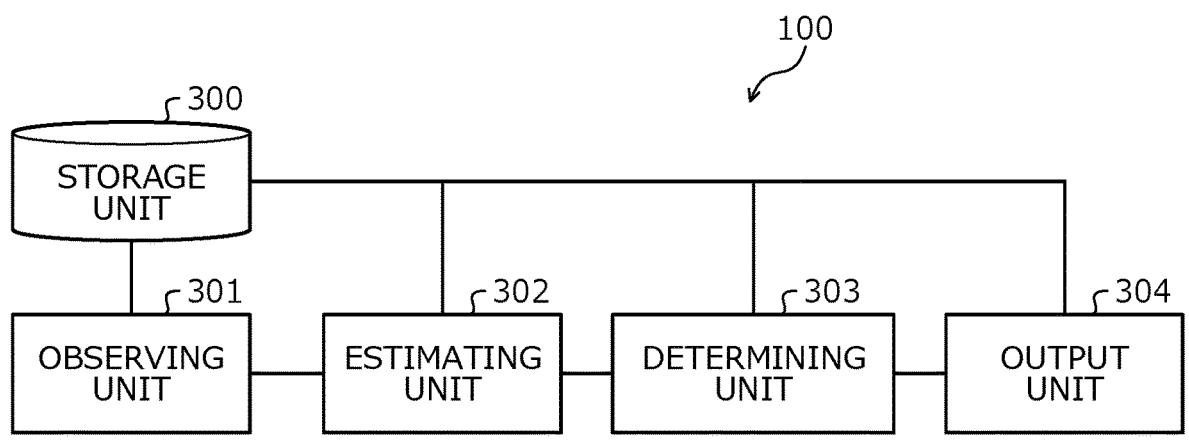
FIG. 3 is a block diagram of an example of a functional configuration of the reinforcement learning apparatus 100.

FIG. 3 is a block diagram of an example of the functional configuration of the reinforcement learning apparatus 100. The reinforcement learning apparatus 100 includes a storage unit 300, an observing unit 301, an estimating unit 302, a determining unit 303, and an output unit 304.

The storage unit 300 is realized by, for example, a storage area such as the memory 202 or the recording medium 205 depicted in FIG. 2. The components from the observing unit 301 to the output unit 304 are functions constituting a control unit. Functions of the components from the observing unit 301 to the output unit 304 are realized by, for example, executing on the CPU 201, the programs stored in a storage area such as the memory 202 or the recording medium 205 depicted in FIG. 2 or by the network I/F 203. Processing results of the functional units are stored to a storage area such as the memory 202 or the recording medium 205 depicted in FIG. 2.

The storage unit 300 accumulates the inputs, the outputs, and the immediate cost or the immediate reward of the controlled object 110. The storage unit 300 may thereby enable the estimating unit 302 and the determining unit 303 to refer to the inputs, the outputs, and the immediate cost or the immediate reward of the controlled object 110.

The observing unit 301 observes the outputs, and the immediate cost or the immediate reward of the controlled object 110, and outputs these items to the storage unit 300. The observing unit 301 may thereby enable the storage unit 300 to accumulate therein the inputs, the outputs, and the immediate cost or the immediate reward of the controlled object 110.

The estimating unit 302 estimates the coefficients of the value function based on the inputs at times further in the past than the present time, the outputs at the present time and the times in the past, and the immediate cost or the immediate reward corresponding to the input at the times in the past. The value function is a function to evaluate the controlled object 110 and is a function that represents the accumulated cost acquired by accumulating the costs that are each a loss of the controlled object 110 or the accumulated reward acquired by accumulating the rewards that are each a benefit of the controlled object 110. The estimating unit 302 may thereby estimate the coefficients of the value function and may identify the estimation function of the value function that uses the estimated coefficients.

The value function is represented in the quadratic form of, for example, the inputs at the times in the past and the outputs at the present time and the times in the past. The value function is, for example, a state-value function. The value function is represented by, for example, equation (19) described later in EXAMPLE. The estimating unit 302 may thereby use the state-value function.

The value function is represented in the quadratic form of, for example, the inputs at the present time and the times in the past, and the outputs at the present time and the times in the past. The value function is represented by, for example, equation (20) described later in EXAMPLE. The estimating unit 302 may thereby use a state-action-value function.

The estimating unit 302 estimates the coefficients of the value function for the control problem that uses the value function for which observation is the full observation regarding the inputs at the times in the past and the outputs at the present time and the times in the past. The estimating unit 302 estimates the coefficients of the value function for the control problem for which observation is the full observation for, for example, a vector $z_t$ described later in EXAMPLE. For the control problem, the coefficient that indicates the degree of the influence from the input on the cost or the reward may be unknown. The estimating unit may repeat the estimation of the coefficients of the value function plural times.

The determining unit 303 determines the input value at times after the estimation based on the value function that uses the estimated coefficients. The determining unit 303 calculates the coefficients in the control law based on, for example, the relation between the estimated coefficients in the value function that uses the estimated coefficients and the coefficients in the control law that calculates the input value. The determining unit 303 uses the calculated coefficients to determine the input value. The determining unit 303 may thereby accurately determine the input value.

The determining unit 303 determines the input value at a time after the estimation using the output at a time after the estimation based on the value function using the estimated coefficients. After the estimation, the determining unit 303 determines the input value at the present time using the inputs at the times in the past and the outputs at the present time and the times in the past. The determining unit 303 may thereby accurately determine the input value.

The output unit 304 outputs the determined input value to the controlled object 110. The output unit 304 outputs the determined input value to the storage unit 300. The output unit 304 may thereby store the input value to the storage unit 300 and enable the estimating unit 302 and the determining unit 303 to refer to the input value.

EXAMPLE of the reinforcement learning will be described. In EXAMPLE, the state equation, the output equation, and the immediate cost equation in the quadratic form, of the controlled object 110 are defined by equations (1) to (9) below and the problem setting is executed. In EXAMPLE, the state of the controlled object 110 is not directly observed.

$$x_{t+1}=Ax_t+Bu_t \quad (1)$$

Equation (1) is the state equation of the controlled object 110. "t" is the time indicated as a multiple of a unit time period. "t+1" is the next time when the unit time period elapses from the time t. "$x_{t+1}$" is the state at the next time t+1. "$x_t$" is the state at the time t. "$u_t$" is the input at the time t. "A" and "B" are each a coefficient matrix. Equation (1) represents that a relationship of the state $x_{t+1}$ with the state $x_t$ at the time t is determined by the input $u_t$ at the time t. The coefficient matrices A and B are unknown.

$$y_t=Cx_t \quad (2)$$

Equation (2) is the output equation of the controlled object 110. "$y_t$" is the output at the time t. "C" is a coefficient matrix. Equation (2) represents that the output $y_t$ at the time t is in a relationship determined by the state $x_t$ at the time t. The coefficient matrix C is unknown.

$$x_0 \in \mathbb{R}^n \quad (3)$$

Equation (3) represents that the state $x_o$ is n-dimensional. "n" is known.

$$u_t \in \mathbb{R}^m, t=0,1,2, \quad (4)$$

Equation (4) represents that the input $u_t$ is m-dimensional.

$$A \in \mathbb{R}^{n \times n}, B \in \mathbb{R}^{n \times m}, C \in \mathbb{R}^{p \times n} \quad (5)$$

Equation (5) represents that the coefficient matrix A is n×n-dimensional (has n rows and n columns), that the coefficient matrix B is n×m-dimensional (has n rows and m columns), and that the coefficient matrix C is p×n-dimensional (has p rows and n columns). (A, B) is stabilizable.

$$c_t=c(x_t,u_t)=\tilde{c}(y_t,u_t)=y_t^T Q y_t + u_t^T R u_t \quad (6)$$

Equation (6) is the immediate cost equation of the controlled object 110. "$c_t$" is the immediate cost that is generated after a unit time period corresponding to the input $u_t$ at the time t. The superscript "T" represents transposition. Equation (6) represents that the immediate cost $c_t$ is in a relationship determined by the quadratic form of the output $y_t$ at the time t and the input $u_t$ at the time t. The coefficient matrices Q and R are unknown.

$$Q \in \mathbb{R}^{p \times p}, Q=^T \geq 0 \quad (7)$$

Equation (7) represents that the coefficient matrix Q is p×p-dimensional (has p rows and p columns). "≥0" represents a positive semi-definite symmetric matrix.

$$R \in \mathbb{R}^{m \times m}, R=R^T>0 \quad (8)$$

Equation (8) represents that the coefficient matrix R is m×m-dimensional (has m rows and m columns). ">0" represents a positive definite symmetric matrix.

$$\text{rank}\begin{bmatrix} C \\ CA \\ CA^2 \\ \vdots \\ CA^{n-1} \end{bmatrix} = n \quad (9)$$

Equation (9) represents that (A, C) is observable and the rank of the observability matrix thereof is n.

In EXAMPLE, the control law to determine the input $u_t$ at the time t is defined in accordance with equation (10) below based on an advantageous control law in a situation where the coefficient matrices of the state equation, the output equation, and the immediate cost equation in the quadratic form are known.

$$u_t = F_{0,t}^y y_t + F_{1,t}^y y_{t-1} + \ldots + F_{n-1,t}^y y_{t-(n-1)} + F_{1,t}^u u_{t-1} + F_{2,t}^u u_{t-2} + \ldots + F_{n-1,t}^u u_{t-(n-1)} + \varepsilon_t \quad (10)$$

"$F_{i,t}^y$" is the coefficient matrix at the time t and represents the coefficient matrix regarding the output $y_{t-i}$. "$F_{i,t}^u$" is the coefficient matrix at the time t and represents the coefficient matrix regarding the input $u_{t-i}$. Equation (10) is an equation to determine the input at the time t based on the outputs and the inputs from the time t to n−1 unit time periods, using the situation where the dimensions of the state of the controlled object 110 is known. "$\varepsilon_t$" is an exploration term at the time t. When an observable index is known, this observable index may be used.

Equation (11) below is set in a situation where the immediate cost $c_t$ is in the quadratic form of the output $y_t$ and the input $u_t$, and (C,A) is observable.

$$z_t = \begin{bmatrix} y_t \\ y_{t-1} \\ \vdots \\ y_{t-(n-2)} \\ y_{t-(n-1)} \\ u_{t-1} \\ u_{t-2} \\ \vdots \\ u_{t-(n-2)} \\ u_{t-(n-1)} \end{bmatrix} \quad (11)$$

"$z_t$" is a vector formed by collecting the inputs $u_{t-1}$ to $u_{t-(n-1)}$ from one unit time period before the time t to n−1 unit time periods and the outputs $y_t$ to $y_{t-(n-1)}$ from the time t to n−1 unit time periods.

When equation (11) is set, equation (12) below is derived.

$$z_{t+1} = A_z z_t + B_z u_t \quad (12)$$

The reinforcement learning apparatus 100 may thereby handle the controlled object 110 as a fully observed control problem regarding a vector $z_t$ that is directly observed. The reinforcement learning apparatus 100 updates the coefficient matrix $F_t$ defined in accordance with equation (13) below based on the vector $z_t$ and the immediate cost $c_t$ using equation (12).

$$F_t = [F_{0,t}^y, F_{1,t}^y, \ldots, F_{n-1,t}^y | F_{1,t}^u, F_{2,t}^u, \ldots, F_{n-1,t}^u] \quad (13)$$

"$F_t$" is the coefficient matrix formed by collecting the coefficient matrices $F_{i,t}^y$ and $F_{i,t}^u$ in equation (10). $F_t$ represents, for example, the coefficient matrix after the updating at the time t. The reinforcement learning apparatus 100 determines the input $u_t$ in accordance with equation (10) based on the updated coefficient matrix $F_t$ at the time t thereafter.

In the following description, the coefficient matrix $F_t$ may be written simply as "coefficient matrix F" without distinguishing the time t of update. A specific example will be described where the coefficient matrix F defined in accordance with equation (13) is updated.

A nature of the problem setting in accordance with equations (1) to (9) will be described that enables this problem setting to be handled equivalently to the problem setting that is fully observed regarding the vector $z_t$.

When equation (1) is substituted in equation (2), an equation is produced that has the outputs $y_t$ to $y_{t-n}$ respectively at the times t to t−n and a mathematical expression using the coefficient matrices A, B, C, and the like in the state equation and the output equation, connected therein to each other by an equal sign. The output $y_t$ at the time t is connected by an equal sign to, for example, a mathematical expression that uses the coefficient matrices A, B, and C, the inputs $u_{t-1}$ to $u_{t-n}$ at the times further in the past than the time t, and the state $x_{t-n}$ at the time t−n.

The output $y_{t-1}$ at the time t−1 is connected by an equal sign to, for example, a mathematical expression that uses the coefficient matrices A, B, and C, the inputs $u_{t-2}$ to $u_{t-n}$ further in the past than the time t−1, and the state $x_{t-n}$ at the time t−n. Similarly, the outputs $y_{t-2}$ to $y_{t-(n-1)}$ at the times t−2 to t−(n−1) are connected by an equal sign to a mathematical expression that uses the coefficient matrices A, B, and C, the inputs further in the past than this time, and the state $x_{t-n}$ at the time t−n. The output $y_{t-n}$ at the time t−n is connected by an equal sign to, for example, a mathematical expression that uses the coefficient matrix C and the state $x_{t-n}$ at the time t−n.

When the equations regarding the times t−2 to t−(n−1) are combined with each other, an equation is produced regarding a vector including the outputs $y_{t-1}$ to $y_{t-n}$, a vector including the inputs $u_{t-2}$ to $u_{t-n}$, and the state $x_{t-n}$. Because (C,A) is observable, a left inverse matrix is present for the coefficient matrix that includes C, CA, ..., $CA^{n-1}$ regarding the state $x_{t-n}$.

Using this left inverse matrix, the state $x_{t-n}$ is represented by the vector $z_{t-1}$ multiplied by the coefficient matrix using the vector $z_t$. The equation formed by connecting the output $y_t$ at the time t to the mathematical expression that uses the coefficient matrices A, B, and C, the inputs $u_{t-1}$ to $u_{t-n}$ at the times further in the past than the time t, and the state $x_{t-n}$ at the time t−n is transformed as equation (14) below.

$$z_{t+1} = A_z z_t + B_z u_t \quad (14)$$

$$A_z = \begin{bmatrix} A_z^{11} & A_z^{12} \\ \hline A_z^{21} & A_z^{22} \end{bmatrix},$$

$$A_z^{11} = \begin{bmatrix} \Xi_1^y & \Xi_2^y & \cdots & \Xi_{n-1}^y & \Xi_n^y \\ I & O & \cdots & O & O \\ O & I & & O & O \\ \vdots & & \ddots & & \vdots \\ O & & & I & O \\ O & O & \cdots & O & I \end{bmatrix},$$

$$A_z^{12} = \begin{bmatrix} \Xi_2^u & \Xi_3^u & \cdots & \Xi_n^u \\ I & O & \cdots & O \\ O & O & \cdots & O \\ \vdots & & \ddots & \vdots \\ O & O & \cdots & O \end{bmatrix},$$

$$A_z^{21} = \begin{bmatrix} O & O & \cdots & O & O \\ O & O & \cdots & O & O \\ O & O & \cdots & O & O \\ \vdots & \vdots & \ddots & \vdots & \vdots \\ O & O & \cdots & O & O \end{bmatrix},$$

$$A_z^{22} = \begin{bmatrix} O & O & \cdots & & O \\ I & O & \cdots & & O \\ O & I & & O & O \\ \vdots & & \ddots & & \vdots \\ O & O & \cdots & I & O \end{bmatrix},$$

$$B_z = [B^T C^T, O, \ldots, O | I, O, \ldots, O, O]^T$$

"$A_z$" and "$B_z$" are coefficient matrices. Equation (14) represents that the vector $z_{t+1}$ at the next time t+1 has a relation with the vector $z_t$ at the time t determined by the input $u_t$ at the time t. The coefficient matrices $A_z$ and $B_z$ are unknown. When equation (15) below is applied to equation (14), equation (16) below is derived.

$$u_t = F z_t \quad (15)$$

$$z_{t+1} = (A_z + B_z F) z_t \quad (16)$$

Based on equation (16), equations (17) and (18) are defined.

$$\varphi_{+s}(z:F) := (A_z + B_z F)^s z \quad (17)$$

"s" is a non-negative integer.

$$(A_z + B_z F)^0 := I \quad (18)$$

"φ+s(z:F)" is the state after s time units of a system starting to vary from z under the feedback control using the coefficient matrix F. Referring to equation (6), using equation (18), equation (19) below is defined as the state-value function.

$$V(z:F) = \Sigma_{s=0}^{\infty} \gamma^s c(\varphi_{+s}(z:F), F\varphi_{+s}(z:F)) \quad (19)$$

"γ" is a discount rate. γ is between 0 to 1. Equation (20) below is defined as the state-action-value function.

$$Q(z, u:F) = c(z, u) + \gamma V(A_z, B_z : F) \quad (20)$$
$$= c(z, u) + \gamma Q(A_z z + B_z u, F(A_z z + B_z u) : F)$$

The problem setting based on equations (1) to (9) thereby becomes equivalent to the problem setting that is fully observed regarding the vector $z_t$ and that uses equation (14) and equation (19) or (20). The reinforcement learning apparatus 100 updates the coefficient matrix F using equation (19) or (20).

For example, the reinforcement learning apparatus 100 expresses the function Q of equation (20) using the quadratic form of u and z, and produces an equation formed by connecting the function Q by an equal sign to the immediate cost. The reinforcement learning apparatus 100 calculates the coefficient matrix for u and z of this equation using, as teacher data, the observed inputs $u_t$, $u_{t-1}$, . . . , $u_{t-n-1}$, the vectors $z_t$, $z_{t-1}$, . . . , $z_{t-n-1}$, and the immediate costs $c_{t-1}$, $c_{t-2}$, . . . , $c_{t-n-2}$.

When the reinforcement learning apparatus 100 calculates the coefficient matrix, the reinforcement learning apparatus 100 may use, for example, a batch least squares method, a sequential least squares method, a batch LSTD algorithm, or a sequential LSTD algorithm. For the batch least squares method, the sequential least squares method, the batch LSTD algorithm, and the sequential LSTD algorithm, Y. Zhu and X. R. Li, "Recursive Least Squares with Linear Constraints", Communications in Information and Systems, Vol. 7, No. 3, pp. 287-312, 2007; and C. Dann and G. Neumann and J. Peters, "Policy Evaluation with Temporal Differences: A Survey and Comparison", Journal of Machine Learning Research, Vol. 15, pp. 809-883, 2014 may be referred to.

The reinforcement learning apparatus 100 updates the coefficient matrix F based on the calculated coefficient matrix and an equation for which the result of differentiation of the function Q with respect to u is zero. For the updating of the coefficient matrix F, S. J. Bradtke, B. E. Ydstie and A. G. Barto, "Adaptive linear quadratic control using policy iteration", In Proc. of the 1994 American Control Conference, pp. 3475-3479, Baltimore, USA, 1994, may be referred to.

The reinforcement learning apparatus 100 determines the input value at the present time based on equation (10) using the updated coefficient matrix F. While a case where the reinforcement learning apparatus 100 uses the immediate cost has been described, the item used is not limited hereto. For example, the reinforcement learning apparatus 100 may use the immediate reward.

The reinforcement learning apparatus 100 may thereby accurately determine the input value for the controlled object 110 and may also efficiently minimize the accumulated cost because the reinforcement learning apparatus 100 uses the output at the present time when the reinforcement learning apparatus 100 determines the input value at the present time. The reinforcement learning apparatus 100 may therefore facilitate reduction of the time period for establishing the state where the state of the controlled object 110 is advantageous. Even when the state of the controlled object 110 is varied due to an external factor, the reinforcement learning apparatus 100 may efficiently control the controlled object 110 in a relatively short time period from the variation.

Specific examples of the controlled object 110 will be described with reference to FIGS. 4 and 5.

Figure 4:
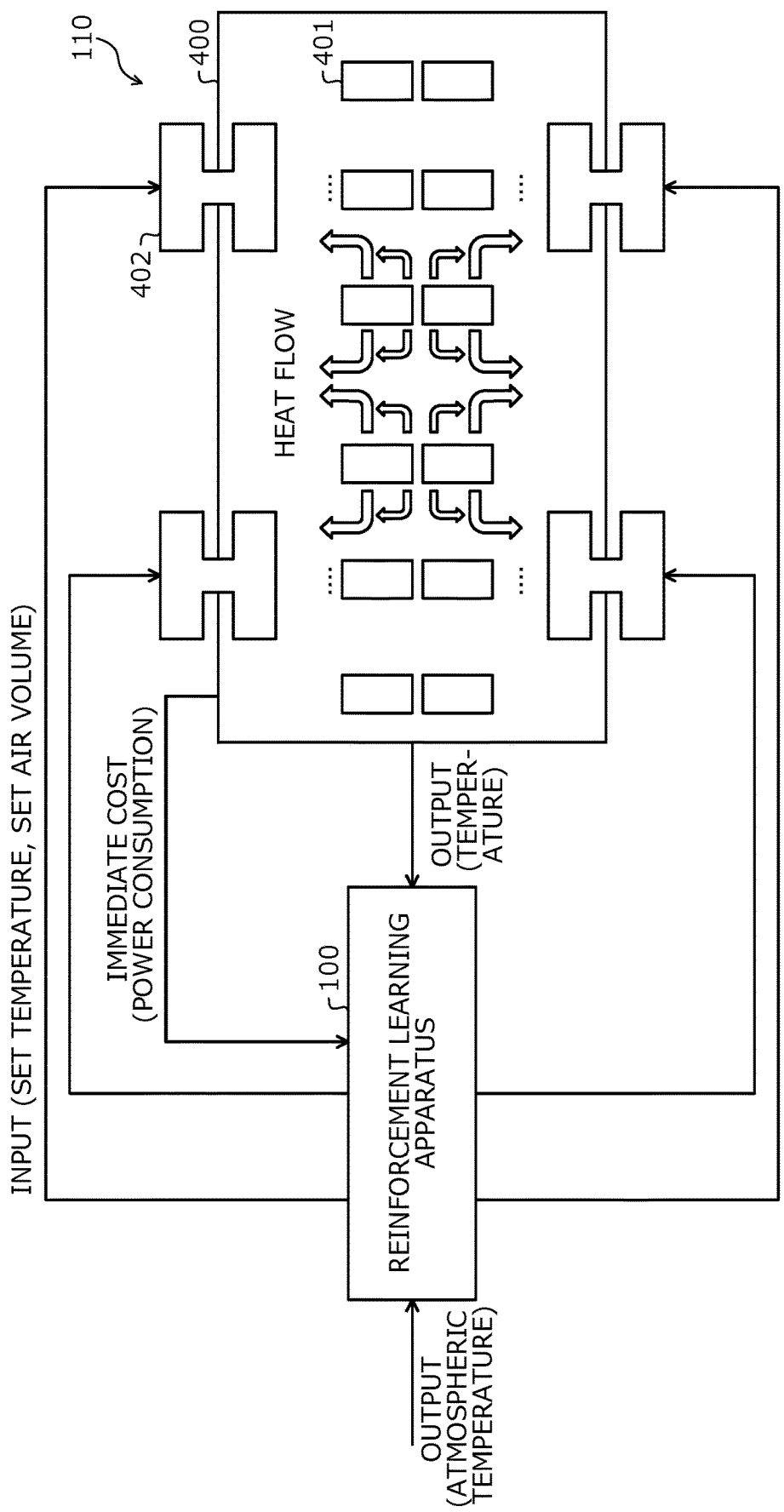
FIG. 4 is an explanatory diagram of a specific example of a controlled object 110.
Figure 5:
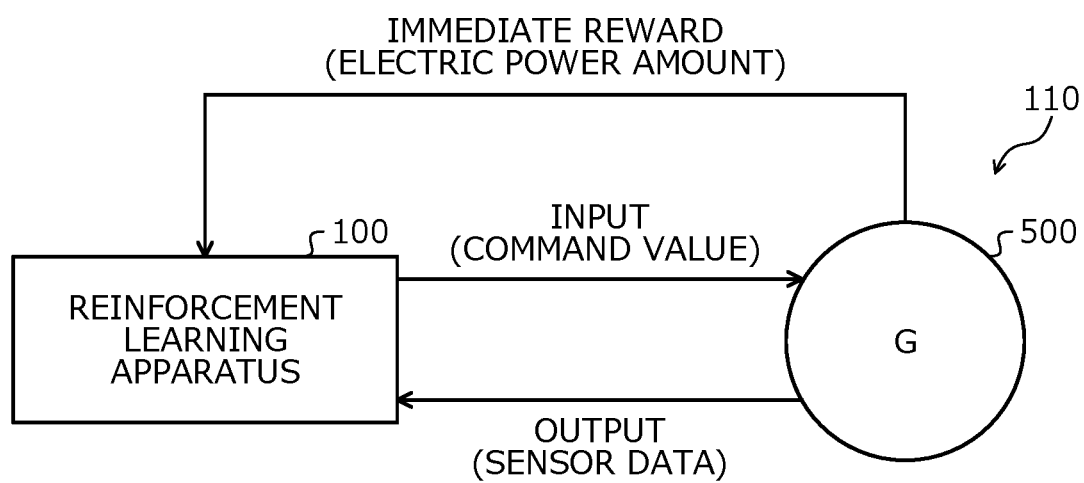
FIG. 5 is an explanatory diagram of a specific example of the controlled object 110.

FIGS. 4 and 5 are explanatory diagrams each of a specific example of the controlled object 110. In the example of FIG. 4, the controlled object 110 is a server room 400 that includes a server 401 to be a heat source, and a cooler 402 such as a CRAC or a chiller.

The input is a set temperature or a set air volume for the cooler 402. The output is sensor data from a sensor device disposed in the server room 400 and is, for example, a temperature. The output may be data regarding the controlled object 110 acquired from any object other than the controlled object 110 and may be, for example, the atmospheric temperature or the weather. The state is, for example, the temperature in the server room 400 that includes a temperature that is not observable as an output. The immediate cost is, for example, the power consumption for 5 minutes of the server room 400. The value function is, for example, the accumulated power consumption of the server room 400.

In the example of FIG. 4, analysis of the influence of the set temperature and the set air amount for the cooler 402 acting on the power consumption of the server room 400 tends to be difficult and the influence may be unknown. In other words, a case is present where the influence of the input on the immediate cost is unknown and a case is present where the coefficient matrix for the input of the immediate cost equation in the quadratic form is unknown. Even in these cases, the reinforcement learning apparatus 100 may control the controlled object 110.

With the fourth control approach, because it is difficult to set any advantageous values as k and l, it is difficult in the example of FIG. 4 to efficiently learn the control law and accurately determine the input value for the controlled object 110. In contrast, because the reinforcement learning apparatus 100 does not use k and l, the reinforcement learning apparatus 100 enables efficient learning of the control law and accurate determination of the input value for the controlled object 110 to be facilitated even in the example of FIG. 4.

For example, with the fourth control approach, because the output at the present time is not used when the input value at the present time is determined, it is difficult in the example of FIG. 4 to efficiently learn the control law and accurately determine the input value for the controlled object 110. In contrast, because the reinforcement learning apparatus 100 uses the output at the present time when the reinforcement learning apparatus 100 determines the input value at the present time, the reinforcement learning apparatus 100 may accurately determine the input value for the controlled object 110 even in the example of FIG. 4.

With the fifth control approach, because the coefficient matrix in the immediate cost equation in the quadratic form with respect to the input for the controlled object 110 is used as the part of the control law, a situation is assumed where the coefficient matrix in the immediate cost equation in the quadratic form with respect to the input for the controlled object 110 is assumed to be known and thus, the control law cannot be learned in the example of FIG. 4. In contrast, the reinforcement learning apparatus 100 may expand the scope of the object that may be set as the controlled object 110 because the coefficient matrix in the immediate cost equation in the quadratic form with respect to the input for the controlled object 110 may be unknown.

In the example of FIG. 5, the controlled object 110 is an electric generator 500. The input is a command value for the electric generator 500. The output is sensor data from a sensor device disposed in the electric generator 500. The state is, for example, the rotation amount of a turbine of the electric generator 500. The immediate reward is, for example, the generated electric power amount for 5 minutes of the electric generator 500. The value function is, for example, the accumulated generated electric power amount of the electric generator 500.

In the example of FIG. 5, a case is present where the influence of the command value for the electric generator 500 acting on the generated electric power amount of the electric generator 500 is unknown. In other words, a case is present where the influence of the input on the immediate reward is unknown and a case is present where the coefficient matrices for the input in the immediate cost equation in the quadratic form are unknown. Even in these cases, the reinforcement learning apparatus 100 may control the controlled object 110. The controlled object 110 may be, for example, a chemical plant, an autonomous mobile robot, or an industrial robot.

An example of a procedure for a reinforcement learning process will be described with reference to FIGS. 6 and 7.

FIG. 6 is a flowchart of an example of the procedure for the reinforcement learning process in a batch processing form. In the example of FIG. 6, a case will be described where the reinforcement learning apparatus 100 uses the state-action-value function as the value function.

In FIG. 6, the reinforcement learning apparatus 100 first initializes the coefficient matrix F, determines the inputs $u_0$, $u_1, \ldots,$ and $u_{n-2}$, and observes the outputs $y_0, y_1,$ and $y_{n-2}$, and the immediate costs $c_0, c_1, \ldots,$ and $c_{n-3}$ (step S601).

The reinforcement learning apparatus 100 observes the output $y_t$ and the immediate cost $c_{t-1}$ that correspond to the previous input $u_{t-1}$, and calculates the input $u_t = Fz_t + \varepsilon_t$ (step S602). The reinforcement learning apparatus 100 determines whether the reinforcement learning apparatus 100 has repeated step S602 N times (step S603).

When the reinforcement learning apparatus 100 determines that the reinforcement learning apparatus 100 has not repeated step S602 N times (step S603: NO), the reinforcement learning apparatus 100 returns to the process at step S602. On the other hand, when the reinforcement learning apparatus 100 determines that the reinforcement learning apparatus 100 has repeated step S602 N times (step S603: YES), the reinforcement learning apparatus 100 moves to the process at step S604.

The reinforcement learning apparatus 100 calculates the estimation function of the value function, based on the inputs $u_t, u_{t-1}, \ldots, u_{t-n-t}$, the vectors $z_t, z_{t-1}, \ldots, z_{t-n-1}$, and the immediate costs $c_{t-1}, c_{t-2}, \ldots, c_{t-n-2}$ (step S604).

The reinforcement learning apparatus 100 updates the coefficient matrix F, based on the estimation function of the value function (step S605). The reinforcement learning apparatus 100 returns to the process at step S602. The reinforcement learning apparatus 100 may thereby control the controlled object 110. When the reinforcement learning apparatus 100 uses the state-value function and not the state-action-value function, the reinforcement learning apparatus 100 needs not use the input $u_t$ in each of the above processes.

FIG. 7 is a flowchart of an example of a procedure for a reinforcement learning process in a sequential processing form. In the example of FIG. 7, a case will be described where the reinforcement learning apparatus 100 uses the state-action-value function as the value function.

In FIG. 7, the reinforcement learning apparatus 100 first initializes the coefficient matrix F and the estimation function of the value function, determines the inputs $u_0$, $u_1, \ldots, u_{n-2}$, and observes the outputs $y_0, y_1, \ldots, y_{n-2}$ and the immediate costs $c_0, \ldots, u_{n-2}$ (step S701).

The reinforcement learning apparatus 100 observes the output $y_t$ and the immediate cost $c_{t-1}$ that correspond to the previous input $u_{t-1}$, and calculates the input $u_t = Fz_t + \varepsilon_t$ (step S702). The reinforcement learning apparatus 100 updates the estimation function of the value function, based on the inputs $u_t$ and $u_{t-1}$, the vectors $z_t$ and $z_{t-1}$, and the immediate cost $c_{t-1}$ (step S703).

The reinforcement learning apparatus 100 determines whether the reinforcement learning apparatus 100 has repeated step S703 N times (step S704). When the reinforcement learning apparatus 100 determines that the reinforcement learning apparatus 100 has not repeated step S703 N times (step S704: NO), the reinforcement learning apparatus 100 returns to the process at step S702. On the other hand, when the reinforcement learning apparatus 100 determines that the reinforcement learning apparatus 100 has repeated step S703 N times (step S704: YES), the reinforcement learning apparatus 100 moves to the process at step S705.

The reinforcement learning apparatus 100 updates the coefficient matrix F, based on the estimation function of the value function (step S705). The reinforcement learning apparatus 100 returns to the process at step S702. The reinforcement learning apparatus 100 may thereby control the controlled object 110. When the reinforcement learning apparatus 100 uses the state-value function and not the state-action-value function, the reinforcement learning apparatus 100 needs not use the input $u_t$ in each of the above processes.

As described, according to the reinforcement learning apparatus 100, the coefficients of the value function may be estimated based on the inputs at the times in the past, the outputs at the present time and the times in the past, and the cost or the reward corresponding to the inputs at the times in the past. According to the reinforcement learning apparatus 100, the input value at the time after the estimation may be determined based on the value function that uses the estimated coefficients. The reinforcement learning apparatus 100 may thereby efficiently learn the control law and accurately determine the input value.

According to the reinforcement learning apparatus 100, the function that is represented by the quadratic form of the inputs at the present time and the times in the past, and the outputs at the present time and the times in the past may be used as the value function. The reinforcement learning apparatus 100 may thereby use the state-action-value function.

According to the reinforcement learning apparatus 100, the input value at the time after the estimation may be determined using the outputs at the times after the estimation based on the value function. The reinforcement learning apparatus 100 may thereby facilitate improvement of the precision for determining the input value.

According to the reinforcement learning apparatus 100, the coefficients of the value function may be estimated for the control problem using the value function that is fully observed regarding the inputs at the times in the past and the outputs at the present time and the times in the past. The reinforcement learning apparatus 100 may thereby learn the control law and determine the input value even for the case where the coefficient that indicates the degree of the influence of the input acting on the cost or the reward is unknown.

The reinforcement learning method described in the present embodiment may be realized by causing a computer such as a personal computer, a work station, or a microcontroller to execute the programs prepared in advance. The reinforcement learning program described in the present embodiment is recorded in a computer-readable recording medium such as a hard disk, a flexible disk, a CD-ROM, an MO, or a DVD, and is executed by being read by a computer from the recording medium. The reinforcement learning program described in the present embodiment may be distributed through a network such as the Internet.

According to an aspect of the present invention, an effect is achieved in that accurate determination of the input value for the controlled object may be facilitated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium storing therein a reinforcement learning program using a value function that causes a computer to execute a process comprising:
    estimating first coefficients of the value function represented in a quadratic form of inputs for a controlled object at the times in the past than a present time and outputs from the controlled object at the present time and the times in the past, the first coefficients being estimated based on inputs for the controlled object at the times in the past, the outputs from the controlled object at the present time and the times in the past, and costs or a rewards that corresponds to the inputs at the times in the past, the controlled object being a controlled object that is not directly observed, the value function representing an accumulated cost or an accumulated reward given to the controlled object; and
    determining a second coefficients that defines a control law, based on the value function that uses the estimated first coefficients and determining input values at times after estimation of the first coefficients, wherein
    a coefficient matrices regarding a state in a state equation and an output equation of a controlled object corresponding to the value function satisfies an observability condition.

2. The recording medium according to claim 1, wherein the value function is represented by a quadratic form of the inputs at the present time and the times in the past, and the outputs at the present time and the times in the past.

3. The recording medium according to claim 1, wherein the determining includes using outputs at times after the estimation and determining the input values at times after the estimation, based on the value function.

4. The recording medium according to claim 1, wherein the estimating includes estimating the first coefficients of the value function with respect to a control problem that uses the value function and for which the first coefficients indicating a degree of an influence of an input on a cost or a reward is unknown, the control problem being fully observed regarding the input at the times in the past and the outputs at the present time and the times in the past.

5. A reinforcement learning method using a value function that is executed by a computer, the reinforcement learning method comprising:
    estimating first coefficients of the value function represented in a quadratic form of inputs for a controlled object at times in the past than a present time and outputs from the controlled object at the present time and the times in the past, the first coefficients being estimated based on inputs for the controlled object at the times in the past, the outputs from the controlled object at the present time and the times in the past, and costs or a rewards that corresponds to the inputs at the times in the past, the controlled object being a controlled object that is not directly observed, the value function representing an accumulated cost or an accumulated reward given to the controlled object; and
    determining second coefficients that defines a control law, based on the value function that uses the estimated first coefficients and determining input values at times after estimation of the first coefficients, wherein
    a coefficient matrices regarding a state in a state equation and an output equation of a controlled object corresponding to the value function satisfies an observability condition.

6. A reinforcement learning apparatus using a value function comprising:
    a memory;
    a processor circuitry coupled to the memory, the processor circuitry configured to:
        estimate first coefficients of the value function represented in a quadratic form of inputs for a controlled object at times in the past than a present time and outputs from the controlled object at the present time and the times in the past, the first coefficients being estimated based on inputs for the controlled object at the times in the past, the outputs from the controlled object at the present time and the times in the past, and a costs or a rewards that corresponds to the inputs at the times in the past, the controlled object being a controlled object that is not directly observed, the value function representing an accumulated cost or an accumulated reward given to the controlled object; and determine second coefficients that defines a control law, based on the value function that uses the estimated first coefficients and determine input values at times after estimation of the first coefficients wherein a coefficient matrices regarding a state in a state equation and an output equation of a controlled object corresponding to the value function satisfies an observability condition.

7. The recording medium according to claim 1, wherein the reinforcement learning program determines input values for a controlled object whose coefficient matrices of a state equation, an output equation, and an immediate cost equation or an immediate reward equation are unknown and whose state is not directly observed, and the estimating includes estimating the first coefficients based on the inputs at the times in the past, the outputs at the present time and the times in the past, and immediate costs or immediate rewards that correspond to the inputs at the times in the past.

8. The recording medium according to claim 7, wherein: the state equation comprising $$x_{t+1} = Ax_t + Bu_t,$$

wherein

"t" is the time indicated as a multiple of a unit time period, "t+1" is the next time when the unit time period elapses from the time t, "$x_{t+1}$" is the state at the next time t+1, "$x_t$" is the state at the time t, "$u_t$" is the input at the time t, and "A" and "B" are each a coefficient matrix;

the output equation comprising $$y_t = Cx_t,$$

wherein

"$y_t$" is the output at the time t, and "C" is a coefficient matrix; and the immediate cost equation comprising $$c_t = c(x_t, u_t) = \tilde{c}(y_t, u_t) = y_t^T Q y_t + u_t^T R u_t, \text{ wherein}$$

"$c_t$" is the immediate cost that is generated after a unit time period corresponding to the input $u_t$ at the time t, and the superscript "T" represents transposition.

9. The non-transitory, computer-readable recording medium according to claim 1, wherein the control law comprising $$u_t = F_{0,t}^y y_t + F_{1,t}^y y_{t-1} + \ldots + F_{n-1,t}^y y_{t-(n-1)} + F_{1,t}^u u_{t-1} + F_{2,t}^u u_{t-2} + \ldots + F_{n-1,t}^u u_{t-(n-1)} + \varepsilon_t,$$

wherein "$F^Y_{it}$" is the coefficient matrix at the time t and represents the coefficient matrix regarding the output $y_{t-i}$, "$F^u_{it}$" is the coefficient matrix at the time t and represents the coefficient matrix regarding the input $u_{t-i}$, n−1 represents unit time periods, and "$\varepsilon_t$" is an exploration term at the time t.

10. The non-transitory, computer-readable recording medium according to claim 1, wherein the second coefficient comprising $$F_t = [F_{0,t}^y, F_{1,t}^y, \ldots, F_{n-1,t}^y | F_{1,t}^u, F_{2,t}^u, \ldots, F_{n-1,t}^u],$$

wherein

"Ft" is the coefficient matrix formed by collecting the coefficient matrices $F^Y_{it}$ and $F^u_{it}$, wherein "$F^Y_{it}$" is the coefficient matrix at the time t and represents the coefficient matrix regarding the output $y_{t-i}$, "$F^u_{it}$" is the coefficient matrix at the time t and represents the coefficient matrix regarding the input $u_{t-i}$, and n−1 represents unit time periods.

* * * * *